(12) United States Patent
Schleiss et al.

(10) Patent No.: US 8,414,281 B2
(45) Date of Patent: Apr. 9, 2013

(54) METHOD AND DEVICE FOR PRODUCING A 3D OBJECT BY MEANS OF A GENERATIVE 3D-METHOD

(75) Inventors: Peter Schleiss, St. Gallen (CH); Gideon Levy, Orselina (CH)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 11/993,420

(22) PCT Filed: Jun. 27, 2006

(86) PCT No.: PCT/CH2006/000344
§ 371 (c)(1),
(2), (4) Date: Dec. 20, 2007

(87) PCT Pub. No.: WO2007/000069
PCT Pub. Date: Jan. 4, 2007

(65) Prior Publication Data
US 2010/0111744 A1    May 6, 2010

(30) Foreign Application Priority Data
Jun. 27, 2005   (DE) .................. 10 2005 030 067

(51) Int. Cl.
*B29C 67/00*    (2006.01)
*B29C 35/08*    (2006.01)

(52) U.S. Cl. .................. 425/174.4; 425/210; 425/375

(58) Field of Classification Search ............... 425/174.4, 425/375, 210, 225, 73, 74, 174; 264/113, 264/308, 401, 497
See application file for complete search history.

(56) References Cited

U.S. PATENT DOCUMENTS

| | | | |
|---|---|---|---|
| 5,352,405 A * | 10/1994 | Beaman et al. | ............ 419/45 |
| 5,460,758 A | 10/1995 | Langer et al. | |
| 5,534,104 A | 7/1996 | Langer et al. | |
| 5,536,467 A | 7/1996 | Reichle et al. | |
| 5,647,931 A | 7/1997 | Retallick et al. | |
| 5,658,412 A | 8/1997 | Retallick et al. | |
| 5,730,925 A | 3/1998 | Mattes et al. | |

(Continued)

FOREIGN PATENT DOCUMENTS

| | | |
|---|---|---|
| DE | 19962625 A1 | 7/2000 |
| DE | 202004017854 U1 | 1/2005 |

(Continued)

OTHER PUBLICATIONS

Ren C. Luo et al: "The Development of a Direct Metallic Rapid Prototyping System", Proceedings of the 2004 IEEE International Conference on Robotics & Automation, New Orleans, Apr. 2004, p. 33, col. 2, paragraph II.

(Continued)

*Primary Examiner* — Yogendra Gupta
*Assistant Examiner* — Emmanuel S Luk
(74) *Attorney, Agent, or Firm* — Fitch, Even, Tabin & Flannery LLP (57) ABSTRACT

Method and device for producing a 3D object by means of a generative 3D-method, for example, selective laser sintering (SLS) and selective laser melting (SLM). An infrared sensor can be cross-flown by a tempered fluid in order to prevent the infrared sensor, which is provided in the process chamber of the device, from being impaired by monomer deposits, oligomers or solid material particles during the construction thereof.

17 Claims, 6 Drawing Sheets

U.S. PATENT DOCUMENTS

| | | | |
|---|---|---|---|
| 5,753,171 A | | 5/1998 | Serbin et al. |
| 5,876,767 A | * | 3/1999 | Mattes et al. ............. 425/174.4 |
| 5,904,890 A | | 5/1999 | Lohner et al. |
| 5,908,569 A | | 6/1999 | Wilkening et al. |
| 5,932,059 A | | 8/1999 | Langer et al. |
| 6,042,774 A | | 3/2000 | Wilkening et al. |
| 6,136,257 A | | 10/2000 | Graf et al. |
| 6,353,203 B1 | | 3/2002 | Hokodate et al. |
| 6,526,327 B2 | | 2/2003 | Kar et al. |
| 6,554,600 B1 | | 4/2003 | Hofmann et al. |
| 6,583,379 B1 | | 6/2003 | Meiners et al. |
| 6,672,343 B1 | | 1/2004 | Perret et al. |
| 6,824,714 B1 | | 11/2004 | Turck et al. |
| 6,932,935 B1 | | 8/2005 | Oberhofer et al. |
| 7,153,463 B2 | | 12/2006 | Leuterer et al. |
| 2004/0061260 A1 | | 4/2004 | Heugel |
| 2004/0104499 A1 | | 6/2004 | Keller |
| 2004/0178369 A1 | | 9/2004 | Brock et al. |
| 2004/0200816 A1 | | 10/2004 | Chung et al. |
| 2005/0116391 A1 | | 6/2005 | Lin |
| 2006/0108712 A1 | | 5/2006 | Mattes |
| 2006/0192322 A1 | * | 8/2006 | Abe et al. ..................... 264/497 |
| 2006/0249485 A1 | | 11/2006 | Partanen et al. |

FOREIGN PATENT DOCUMENTS

| | | |
|---|---|---|
| EP | 0 703 036 A2 | 3/1996 |
| EP | 1 634 694 A2 | 3/2006 |
| GB | 2 064 399 A | 6/1981 |
| JP | 2001-269788 A | 10/2001 |
| JP | 2004-306612 A | 11/2004 |
| WO | WO 2004/076102 * | 9/2004 |

OTHER PUBLICATIONS

English Translation of the International Preliminary Report on Patentability and Written Opinion, International Application No. PCT/CH2006/000344, dated Jan. 16, 2008, 6 pages.

* cited by examiner

METHOD AND DEVICE FOR PRODUCING A 3D OBJECT BY MEANS OF A GENERATIVE 3D-METHOD

The invention relates to a method and a device for manufacturing a three-dimensional object in a thermal generative 3D process, e.g., selective laser sintering (SLS) or selective laser melting (SLM).

PRIOR ART

In a generative process, a three-dimensional object is fabricated layer by layer, wherein the following steps are generally executed:
Applying material on a target surface layer-by-layer, in particular selectively, in a processing chamber;
Supplying energy to the layer comprised of material, so as to fuse the material inside the layer and with an underlying material layer of the three-dimensional object to be formed;
Repeating the steps of applying material and supplying energy to build up the object layer-by-layer;
Wherein at least one electromagnetic element is used to inject electromagnetic radiation into the processing chamber and/or the temperature of the target surface and potential other surfaces inside the processing chamber is determined by acquiring the radiation emitted by them.

One example of a generative process is selective laser sintering (SLS), which essentially involves the following steps:
Applying a powder layer onto a target surface;
Supplying energy to selected areas of the layer that correspond to a cross section of the object to be formed in the layer, so as to melt the powder at the selected areas;
Repeating the steps of applying powder and supplying energy to build up the object layer-by-layer.

The unmelted powder is then removed from the object.

To selectively melt the powder onto the target surface within the respective layer and the underlying, already solidified layer, use is made of a laser beam focused on a smallest possible point in the layer plane, which executes a scanning motion inside the respective layer, thereby generating a respective cross section of the object to be formed. The laser beam "writes" or "draws" the respective massive areas of the cross sectional surface by leaving behind a "trace" of melted or fused powder.

Such SLS processes have become increasingly established in recent years for manufacturing prototypes for testing purposes, for finished parts required only in small numbers, or for individualized parts, like bone implants and the like. In this conjunction, reference is also made to the rapid manufacture of prototypes (rapid prototyping, RP process). Depending on the mechanical requirements placed on the three-dimensional object to be manufactured, use is made of pure polymer powder (e.g., PA, PBT, etc.) or powder mixtures, e.g., containing polymer powder mixed with glass powder, ceramic powder, metal powder or other filler materials, whose melting point is generally higher than the melting point of the polymer material. If necessary, pure metal powders or metal powder mixtures are also directly processed.

To avoid material stresses and deformations (shrinking, warping) in the object built up layer-by-layer, as well as sintering outside the focused laser beam, the temperature of the target surface and processing area ("construction area" in which the object is put together) has to be monitored and, if necessary, controlled.

The surface temperature of the target surface is monitored using infrared sensors, for example.

Essentially two measures are taken to influence the surface temperature of the target surface. On the one hand, radiation energy is supplied over a large area of the target surface, e.g., via infrared emitters, and to specific points via the focused laser beam. On the other hand, a temperature-controlled (moderated) gas like nitrogen or argon is allowed to stream over the target surface, so that, in addition to the heat radiated from the target surface, another portion of the waste heat can be eliminated by thermal conduction and removal in the gas.

In practice, however, several problems relating to the IR sensors extending into the processing area are encountered during the operation of such SLS systems.

As a rule, such SLS processes utilize powder materials, in which at least a portion of the powder is a polymer material. As a consequence, vapors (monomers and oligomers) get into the processing area during the construction process as the result of heating the polymer material, which become deposited on an IR lens (gradient lens) or an IR window of the temperature-moderated IR sensors and result in measurement deviations, since the IR sensor sand their lenses or windows are distinctly colder than the processing area containing the vapors. Therefore, the lenses or windows must be routinely cleaned with ethanol or another strong solvent. However, this damages the seals between the lens or window and the main sensor unit, causing them to lose their sealing effect over time.

To avoid such deposits, the IR sensors are preheated to the highest temperatures possible. On the one hand, the objective here is to set the temperature of the IR sensors and their lenses or windows to the highest possible value to minimize such deposits to the greatest extent possible. On the other hand, however, the goal is also to keep the temperature of the IR sensors as low as possible to ensure optimal function and long life. As a rule, the result of this is either that a steadily deteriorating function of the IR sensor owing to deposits must be tolerated during a prolonged construction process (e.g., 20 to 70 h), or that, while little precipitation onto the sensor takes place during the construction process, there is an increased danger that the IR sensor might become prematurely unreliable as a result of too high a temperature over too long a time. This is particularly aggravating when the IR sensor fails in the middle of a very long construction process.

The IR sensors are most often preheated electrically or inductively. This produces magnetic fields that envelop the IR sensor. As a consequence, the electronics used for processing the sensor signals are disrupted.

This will be illustrated once more based on an example:
When processing PA12 (a special type of polyamide) for an object constructed layer-by-layer, a temperature of about 180° C. in the SLS processing chamber is used. The commercially available IR sensors projecting into the processing chamber have a maximum permissible head temperature of 85° C. To largely prevent deposition on the lens or window of the IR sensor, the IR sensor must be preheated to about 80° C. (head temperature). A construction time of about 20-70 h is required for manufacturing an object built up layer-by-layer with vertical dimensions of about 300 mm-400 mm using commercially available SLS systems. This type of construction process is always a risk, because the IR sensor most often overheats over long building times like this, and then becomes defective during the construction process, so that a majority of the building process takes place "blind", and hence without any accurate control/regulation of the process temperature, which leads to the quality impairments mentioned further above. (material stresses and deformations in the built object). As a consequence, several thousand Euros are very quickly lost on powder and system hours.

As evident, the IR sensors necessary for monitoring and control/regulation along with other optical elements, in particular lasers, can be impaired by various influences in terms of their function and life in the known SLS systems or other systems for executing generative 3D processes.

The injection of thermal energy takes place through a so-called laser window, which represents the boundary between the energy source and working area. Problems similar to the ones encountered for the sensor also arise here.

Problems similar to those encountered in selective laser sintering (SLS) also arise during selective laser melting (SLM).

The object of the invention is to improve a system for executing a generative 3D process (e.g., SLS system, SLM system) with an IR sensor used therein and, if necessary, a laser or electron beam (EBM) for the generative process described at the outset (SLS process, SLM process) in such a way that the described disadvantages to prior art can be largely eliminated.

The device according to the invention for the layer-by-layer manufacture of a three-dimensional object in a generative process encompasses a processing chamber, in which the three-dimensional object is gradually formed; a means for applying material layer-by-layer, in particular selectively, onto a target surface in the processing chamber and fusing the material layers of the three-dimensional object to be formed; and at least one electromagnetic element for emitting electromagnetic radiation into the processing chamber and/or receiving electromagnetic radiation from the processing chamber.

According to the invention, the device contains a means for generating a film consisting of a temperature-moderated fluid between the electromagnetic element and the processing chamber volume.

The fluid film builds up a barrier between the processing chamber volume and the electromagnetic element that prevents material released in the processing chamber volume during the generative process in the form of solid particles, oligomers or monomers from getting to the electromagnetic element, becoming deposited thereupon and impairing its function.

The electromagnetic element is preferably an optical element that emits electromagnetic radiation for supplying energy to the processing chamber or receives electromagnetic radiation from the processing chamber.

The electromagnetic element in particular involves an optical sensor, especially an infrared sensor. Such optical sensors are used in many generative processes to acquire the temperature in the processing chamber and on the "construction site surface" in the construction area.

The electromagnetic element can also be a laser. For example, a laser is used in the SLS process and SLM process to selective melt open the respectively applied powder layers and fuse them with the underlying product level.

A means for generating a fluid film is preferably arranged on the electromagnetic element. The means situated directly on the electromagnetic element generates a preferably temperature-moderated fluid film on the electromagnetic element, at least impeding deposits on the latter.

A means for generating a fluid film can also be spaced apart from the electromagnetic element. This keeps material released during the generative process away from an area enveloping the electromagnetic element.

In a special embodiment, a first means for generating a first, preferably temperature-moderated, fluid film is arranged on the electromagnetic element, and a second means for generating a second, not necessarily temperature-moderated, fluid film is spaced apart from the electromagnetic element. This yields a dual barrier that keeps released material away from the electromagnetic element.

It is best for the electromagnetic element to have a casing and a window and/or a lens in the casing, which is directed into the processing chamber, wherein the casing of the electromagnetic element preferably exhibits a channel through which the temperature-moderated fluid can flow. This makes it possible to moderate the temperature of the surface of the window and/or the lens in an especially effective manner, thereby preventing monomers and oligomers, vapors from becoming deposited by temperature moderating and rinsing the surface, while at least the rinsing effect stops precipitation though solid particles.

The channel preferably has an outlet in the area of the window or lens of the electromagnetic element. As a result, the fluid moves at a relatively high speed relative to the window or lens.

It is especially advantageous for the channel in the outlet area to be aligned slanted relative to the window or lens, so that the temperature-moderated fluid can exit into the processing chamber with a flow component parallel to the window surface or lens surface. This produces both an intensive temperature-moderation and rising of the surface of the window and/or lens, and effectively prevents deposits.

The channel can be a channel that envelops the entire electromagnetic element, extending between an inner casing area that directly envelops the electromagnetic element and an outer casing area that envelops the channel. This measure also helps intensify the temperature-moderation of the electromagnetic element. In particular, the channel can exhibit a cross section that is circular or bordered by an inner and outer polygon perpendicular to the direction of flow.

The device according to the invention can exhibit a fluid source, from which a fluid line leads to the electromagnetic element. In addition, it can exhibit a fluid sink through which the fluid is removed form the processing chamber. In particular when using relatively expensive inert gases, e.g., argon, it is advantageous that the fluid sink be fluidically connected with the fluid source, thereby bringing about a fluid circulation, wherein the fluid then is prepared between the fluid sink and the fluid source.

In a special embodiment, the electromagnetic element can be temperature-moderated strictly by the streaming fluid. This eliminates the need for other electrical heating or cooling elements, for example.

The electromagnetic element preferably has a thermal insulating layer applied to the edge of its window and/or its lens, or the edge of its window and/or its lens consists of a thermally insulating material. This ensures that the surface of the insulating layer at the edge of the window or lens has essentially the same temperature as the processing area volume that incorporates released material, thereby largely preventing deposits from forming on the window or lens edge, causing the window or lens to "grow shut".

In the generative method according to the invention for the layer-by-layer manufacture of a three-dimensional object, a material layer is applied to a target surface in a processing chamber layer by layer, in particular selectively, and energy is supplied into the material layer, so as to fuse the material inside the layer and with an underlying material layer of the three-dimensional object to be formed. These steps of applying material and supplying energy are performed repeatedly to build up the object layer by layer. At least one electromagnetic element is used to here inject electromagnetic radiation into the processing chamber, and/or the temperature of the target surface and any other potential surfaces inside the processing chamber is determined by acquiring the radiation emitted by them.

According to the invention, a film consisting of a temperature-moderated fluid is generated between the electromagnetic element and the processing chamber volume.

A film of temperature-moderated fluid is preferably generated on the electromagnetic element. This film is used for rinsing and temperature-moderating the surface of the electromagnetic element, while a film made of not necessarily temperature-modified liquid is generated spaced apart from the electromagnetic element. This film predominantly has a rinsing and barrier function.

In a special embodiment, a first fluid film is generated on the electromagnetic element and a second fluid film is generated spaced apart form the electromagnetic element to form a dual barrier against released material from the electromagnetic element.

In particular protective gas exhibiting nitrogen and/or argon can be used as the temperature-moderated fluid to prevent unwanted oxidation.

The temperature-moderated fluid can stream around the electromagnetic element and exhibit a liquid, wherein in particular the liquid of the temperature-moderated fluid is evaporated after streaming around the electromagnetic element, and enters the processing chamber as vapor. As a result, the electromagnetic element can be cooled. The temperature-moderated fluid flowing around the electromagnetic element is preferably a protective gas that transports liquid drops, which at least partially evaporate as they stream around the electromagnetic element.

The volume of the processing chamber best measures 0.2 $m^3$ to 3 $m^3$, and the flow quantity or throughput of temperature-moderated fluid that streams around the electromagnetic element ranges from 20 $cm^3$/min to 400 $cm^3$/min, preferably between 50 $cm^3$/min to 200 $cm^3$/min, wherein the pressure lies between $0.3 \times 10^5$ Pa and $3 \times 10^5$ Pa, preferably between $0.6 \times 10^5$ Pa to $1.2 \times 10^5$ Pa.

Figure 1:
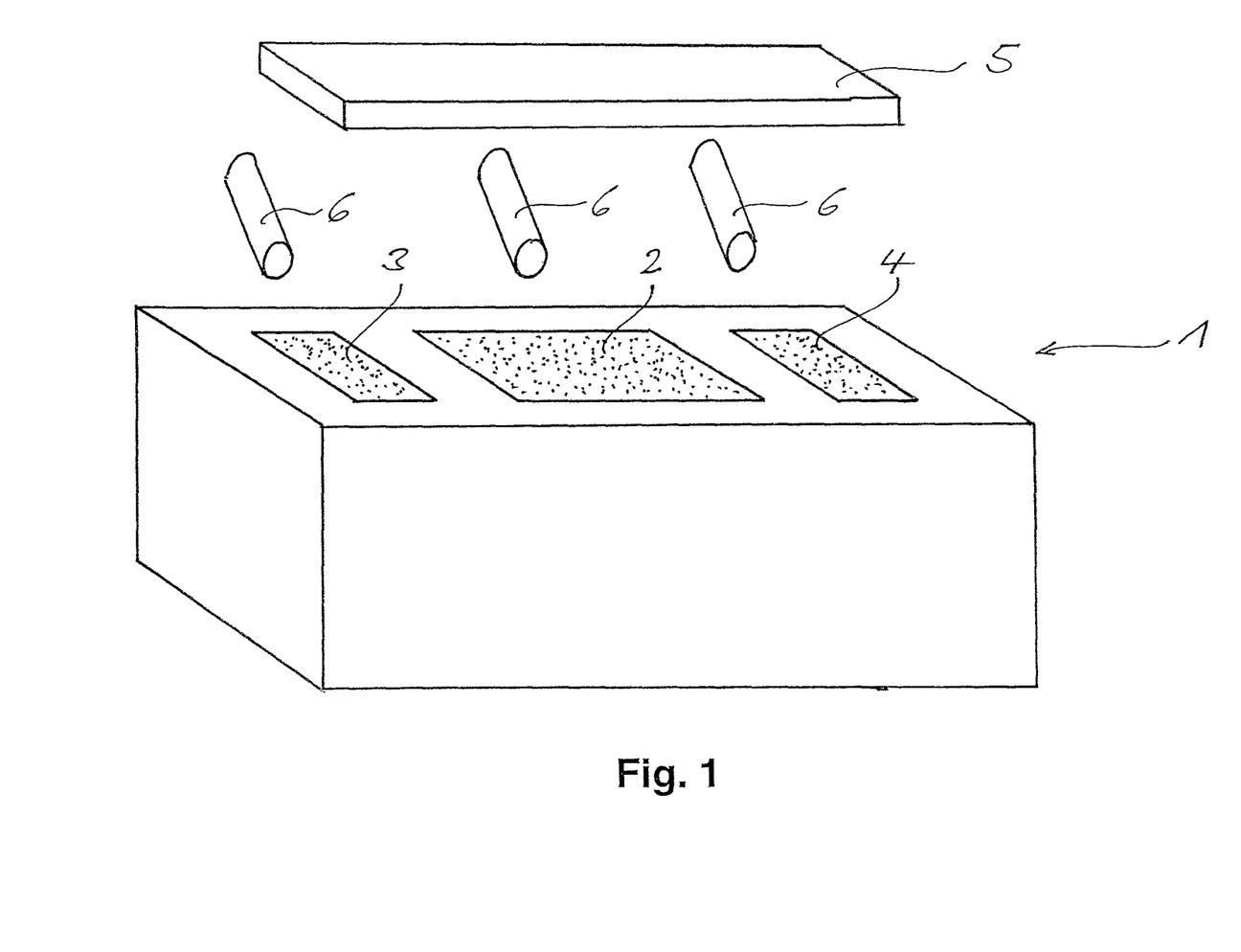
FIG. 1 shows a schematic perspective view of a device for selective laser sintering (SLS machine), inside of which objects can be generated layer by layer.

Additional advantages, features and potential applications of the invention can now be gleaned from the following description of an exemplary embodiment based on the invention, which is not to be regarded as limiting, wherein:

FIG. 1 shows a device for manufacturing a three-dimensional object vie selective laser sintering (SLS process). This so-called SLS system or SLS sintering machine contains a processing chamber 1, in which a three-dimensional object is built up layer-by-layer ("construction process").

The system additionally contains means (not shown) for applying a powder layer onto a target surface 2 in the processing chamber 1. This powder stems from powder containers 3, 4 located on either side of the target surface. The means for applying powder to the target surface 2 can be rollers that can displace the powder from the powder containers 3, 4 to the target surface 2, so that a thin powder layer is deposited onto the target surface 2.

The system also contains means for supplying energy to selected locations on the powder layer, which correspond to a cross section of the object to be formed in the layer, so that the powder can be melted at the selected locations.

The following measures are taken to influence the surface temperature of the target surface:

1) Radiation is imparted to a large area of the target surface 2, e.g., using an infrared emitter (see FIG. 2);
2) A focused laser beam is used to supply energy to points on the target surface 2 to melt open the powder at points;
3) A temperature-controlled (moderated) gas like nitrogen or argon is passed over the target surface 2, so that, in addition to the heat radiated from the target surface 2, another portion of the waste heat can be eliminated by thermal conduction and removal in the gas.

A radiation sensor, e.g., in the form of an IR sensor 6, is used to acquire the radiation emitted from the target surface and any other potential surfaces (3, 4) inside the processing chamber in order to determine the respective surface temperature.

The information about these surface temperatures is used as the basis for initiating heating (measure 1) or cooling (measure 3) to influence the surface temperature of the target surface 2.

The floor of the powder container 3, 4 is moved up in small increments during the construction process, so that powder is always provided on the floor of the processing chamber 1, e.g., which can be moved by the rollers or similar means to the target surface 2. The object formed layer by layer, whose upper, flat surface forms the target surface 2, is moved down in small increments during the construction process, so that the formed object is gradually lowered into a construction container 7 (see FIG. 2), wherein the target surface 2 is flush with the floor of the processing chamber 1.

To prevent the function of the radiation sensor or infrared sensor 6 from being impaired during a construction process as the result of monomer, oligomer or solid particle precipitation, a temperature-moderated fluid can be made stream around it. This makes it possible to achieve a particularly effective temperature moderation for the surface of the sensor or its window and/or its lens, so that monomers and oligomers are prevented from becoming deposited by temperature moderating and rinsing the surface on the one hand, while at least the rinsing effect of the fluid prevents precipitation through solid particles on the other.

Figure 2:
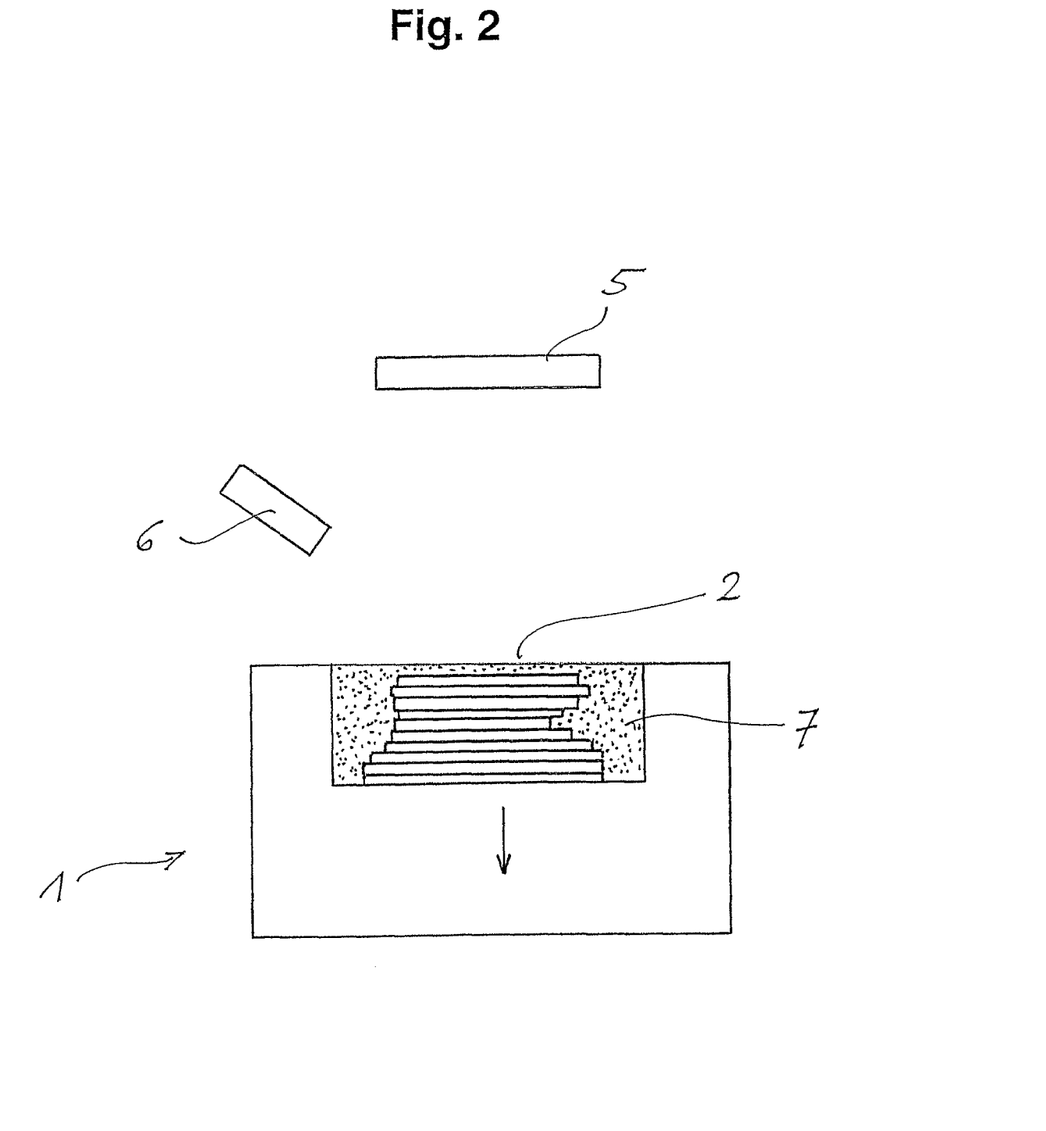
FIG. 2 shows a sectional view through the device on FIG. 1.

The device shown on FIG. 1 and FIG. 2 can hence be used to execute the following process for manufacturing a three-dimensional object:

Applying a powder layer onto a target surface 2;

Supplying energy to selected areas of the layer that correspond to a cross section of the object to be formed in the layer, so as to melt the powder at the selected areas;

Repeating the steps of applying powder and supplying energy to build up the object layer-by-layer, wherein the temperature of the target surface 2 and potential other surfaces inside the processing chamber is determined by acquiring the radiation emitted by them using a radiation sensor 6.

According to the invention, a temperature-moderated fluid flows around the radiation sensor 6.

Figure 3:
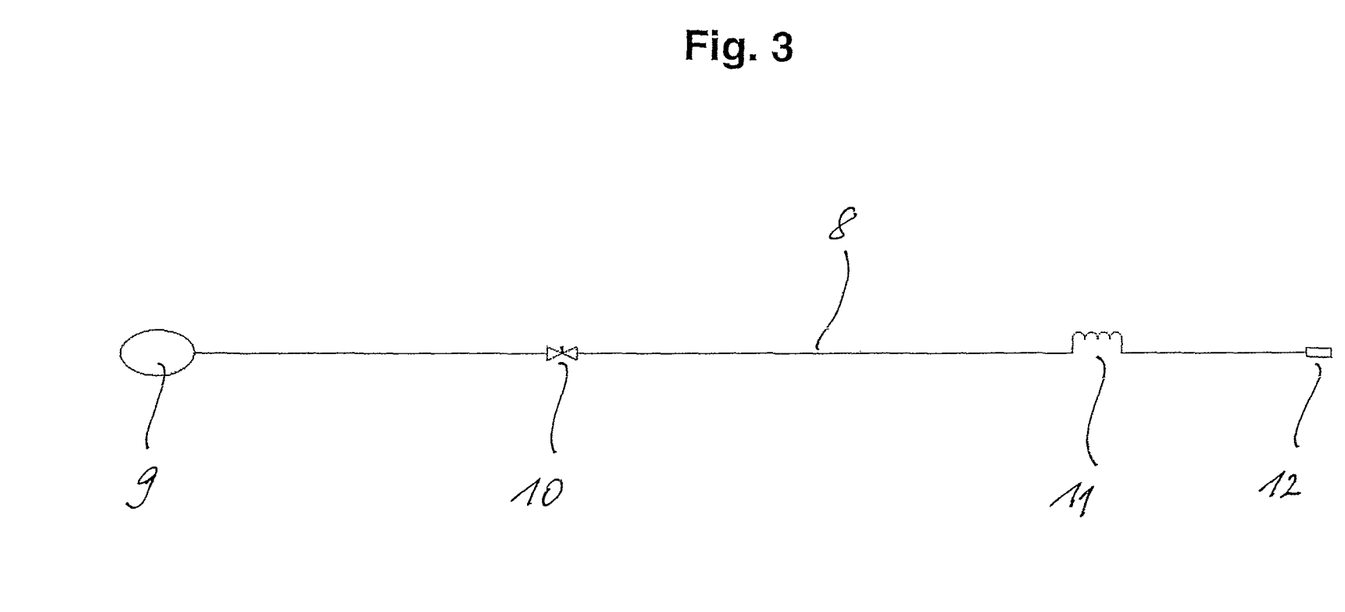
FIG. 3 shows a schematic depiction of the protective gas line.

FIG. 3 is a schematic depiction of the protective gas line 8, in which nitrogen or another inert gas or protective gas like carbon dioxide or argon is routed from a protective gas source 9 through a flow meter 10 and through a heating device 11 to a protective gas blow cap 12, which is coupled to the radiation sensor or IR sensor 6 shown on FIG. 2 (see also FIGS. 5A and 5B), so that the temperature-moderated protective gas flows around the latter. This venting of the sensor 6 with preheated protective gas prevents deposits from forming on the window 6a or the lens of the sensor 6.

The protective gas exiting the blow cap 12 and passed the window 6a or the lens of the sensor 6 into the processing chamber 1 must flow vigorously enough to prevent deposits from forming on the sensor 6 on the one hand, and cannot flow too vigorously on the other hand, so as to prevent powder from swirling in the processing area 1 or even influencing the temperature distribution on the structural component.

A typical volume of the processing chamber 1 measures 0.2 m$^3$ to 3 m$^3$. The flow quantity or throughput of temperature-moderated protective gas flowing around the sensor 6 then ranges from 20 cm$^3$/min to 400 cm$^3$/min, preferably between 50 cm$^3$/min to 200 cm$^3$/min, at a pressure of $0.3 \times 10^5$ Pa to $3 \times 10^5$ Pa, preferably $0.6 \times 10^5$ Pa to $1.2 \times 10^5$ Pa.

While temperature-moderating the sensor 6 by having temperature-moderated protective gas stream around it, one has to move between two critical temperatures. The upper temperature To is the maximum permissible sensor operating temperature. The lower temperature Tu is the sensor surface temperature starting at which notable deposits of vapors (monomers and oligomers) and dusts (solid particles) from the processing chamber 1 start to form on the sensor 6.

For a typical sensor 6 with a maximum of 80° C., the head temperature is set to a peak temperature by the temperature-moderated protective gas flowing around it that is 10° C. to 20° C., preferably 14° C. to 16° C., lower than the maximum permissible head temperature of the sensor 6. These values can change depending on sensor type.

At the edge of its window 6a and/or its lens, the sensor 6 has a cap or cover 14 (see FIG. 5A), which consists of a thermally insulating material, and hence forms a thermally insulating layer. The edge of the sensor window 6a and/or the sensor lens itself can also consist of a thermally insulating material. This ensures that the surface of the cap or cover 14 at the edge of the sensor window 6a or the sensor lens essentially has the same temperature as the processing area volume that accommodates released material. As a result, no deposit can form even in the immediate vicinity of the sensor window 6a or the sensor lens, which could grow into the visual field of the sensor 6a in front of its window or lens until the window 6a or lens grew shut.

Figure 4A:
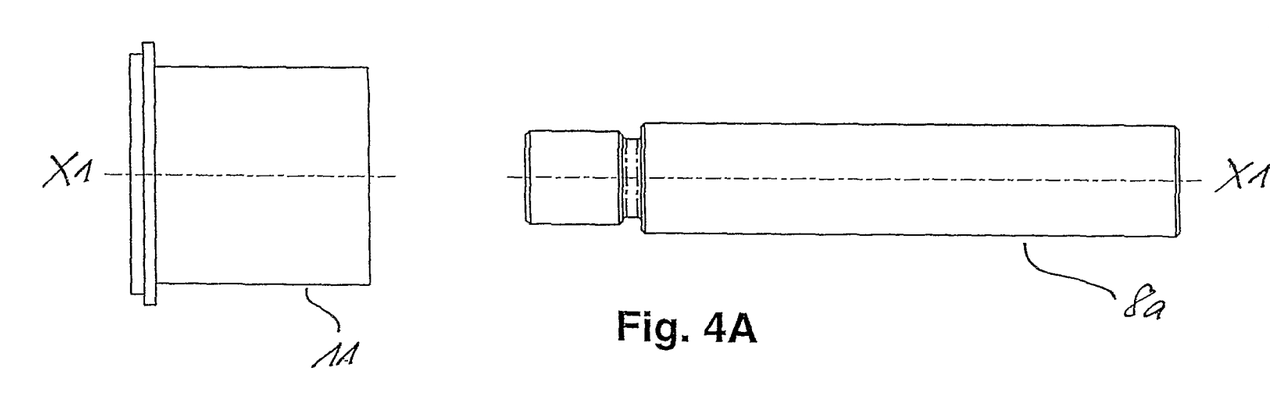
FIG. 4A shows a top view of a disassembled arrangement comprised of a heating element and a protective gas passage.

FIG. 4A shows a top view of a disassembled arrangement (heating arrangement) comprised of a heating element 11 and a protective gas passage 8a, which forms part of the protective gas line 8. The outer surface of the protective gas passage 8a is designed to be complementary to the inner surface of the heating element 11, thereby ensuring a good thermal transfer between the heating element 11 and the protective gas passage 8a. The heating element 11 is preferably an electrical, e.g., resistive heating element or a Peltier heating element. The contacting bodies of the heating element 11 and protective gas passage 8a preferably consist of highly thermally conductive metals like copper, aluminum or alloys containing these metals.

Figure 4B:
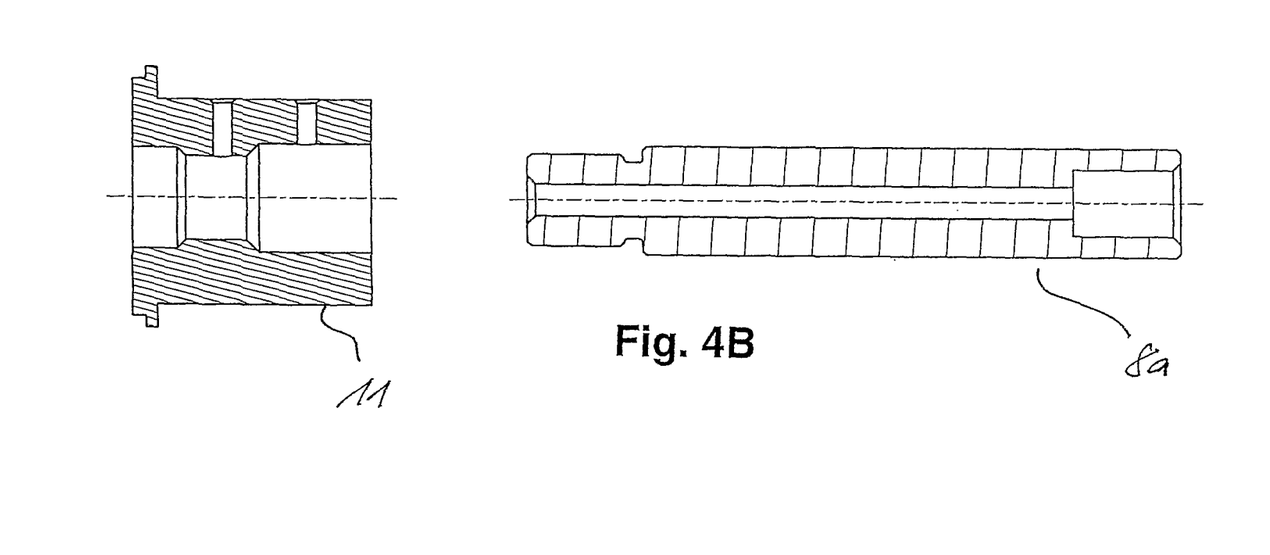
FIG. 4B shows a sectional view through the arrangement on FIG. 4A along sectional plane B-B.

FIG. 4B shows a side view through the arrangement on FIG. 4A along sectional plane X1-X2.

Figure 5A:
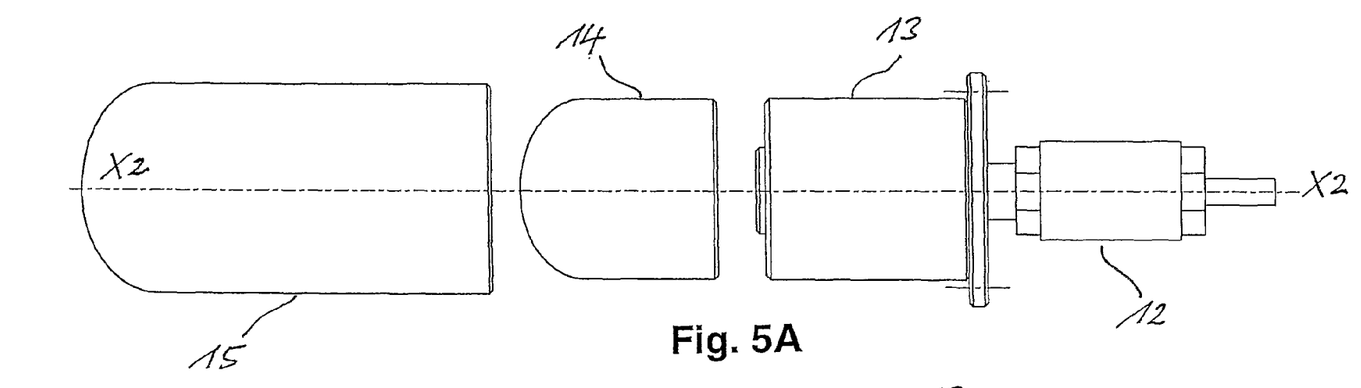
FIG. 5A shows a top view of a partially disassembled arrangement comprised of an electromagnetic element, a cooling element and a means for generating a protective gas film.

FIG. 5A shows a top view of a partially disassembled arrangement (cooling/rinsing arrangement) for a sensor 6(see FIG. 6), a protective gas blow cap 12 for generating a protective gas film that envelops the sensor 6, a cooling element 13 that envelops the sensor body 6b, the cap or cover 14 that protects the sensor 6 and envelops the sensor window 6a, along with a sleeve 15 that can be pushed over the cap or cover 14 and cooling element 13. The contacting bodies of the cooling element 13 and sensor head 6b also preferably consist of highly thermally conductive metals like copper, aluminum or alloys containing these metals. In the assembled cooling/rinsing arrangement, the interaction between the cooling element 13 and the cap or cover 14 moves the protective gas roughly parallel or tangential to the sensor window 6a or passed the sensor lens. This ensures both an efficient temperature moderation and rinsing of the sensor surface.

Figure 5B:
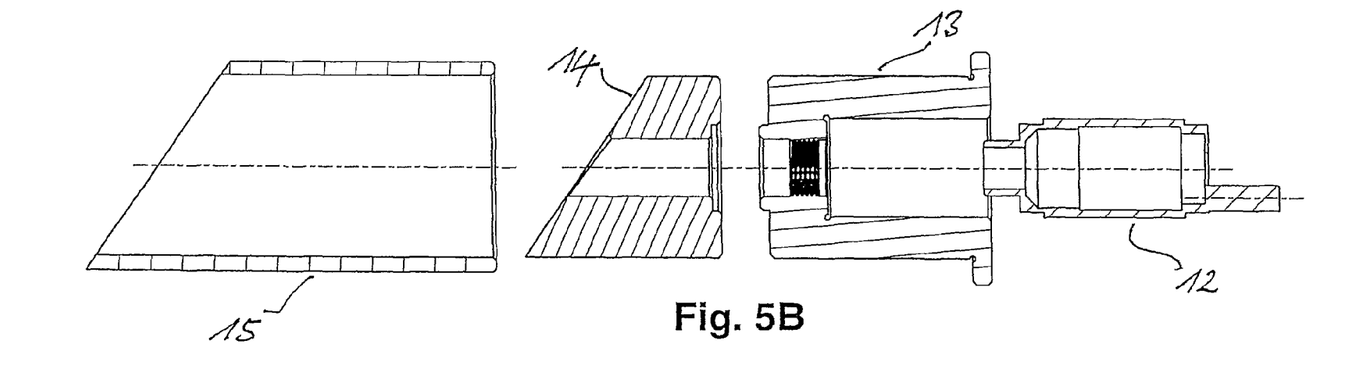
FIG. 5B shows a sectional view through the arrangement on FIG. 3A along sectional plane A-A.

FIG. 5B shows a sectional view through the arrangement on FIG. 3A along the sectional plane X2-X2.

Figure 6:
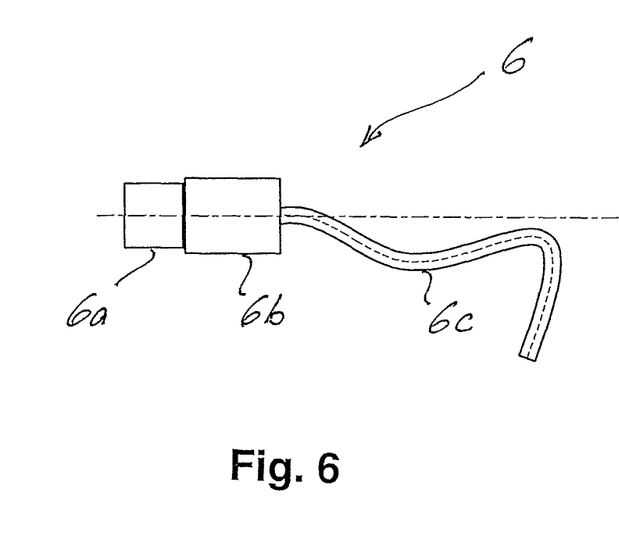
FIG. 6 shows a top view of an electromagnetic IR sensor.

FIG. 6 shows a top view of an IR sensor 6 with sensor lens 6a and body 6b, which is built into the air bubble insert. The sensor cable 6c is a screened cable, and connects the sensor electronics (e.g., integrated into the sensor) with the evaluator electronics.

The preheating or temperature-moderation of the protective gas is decoupled from the cooling of sensor 6 by separately securing the heating arrangement containing the heating element 11 and the cooling/rinsing arrangement containing the cooling element, and by providing the cap or cover 14 in the cooling/rinsing arrangement.

Of course, the separate cooling, temperature-moderation and rinsing of the respective sensor sections (sensor body 6b and sensor window 6a) described here by way of example is not limited to a sensor, but can similarly also be used in a laser or monitoring camera, wherein the separate cooling, temperature-moderation and rinsing is used for the respective laser sections (laser body and laser window) or camera sections.

The invention claimed is:

1. A device for the layer-by-layer manufacture of a three-dimensional object in a generative process, comprising:
    a processing chamber, in which the three-dimensional object is gradually formed;
    a layer-by-layer application mechanism for applying material, onto a target surface in the processing chamber and fusing material layers of the three-dimensional object to be formed; and
    at least one electromagnetic element for emitting electromagnetic radiation in the processing chamber and/or receiving electromagnetic radiation from the processing chamber,
    wherein the device includes a temperature moderated fluid film generation mechanism which generates a temperature moderated and/or flow controlled fluid film out of the temperature-moderated fluid between the electromagnetic element and processing chamber volume,
    wherein the temperature-moderated fluid film generation mechanism includes a fluid source, a fluid line leading the fluid from the fluid source to the process chamber, a heating device configured to heat the fluid flowing through the fluid line, and a blow cap coupled to the electromagnetic element so that the temperature-moderated fluid flows around the electromagnetic element.

2. The device according to claim 1, wherein the at least one electromagnetic element is a laser.

3. The device according to claim 1, wherein the temperature moderated fluid film generation mechanism is arranged on the electromagnetic element.

4. The device according to claim 1, wherein the temperature moderated fluid film generation mechanism is arranged spaced apart from the electromagnetic element.

5. The device according to claim 1, wherein a first temperature moderated fluid film generation mechanism for generating a first fluid film is arranged on the electromagnetic element, and a second temperature moderated fluid film generation mechanism for generating a second fluid film is arranged spaced apart from the electromagnetic element.

6. The device according to claim 1, wherein the channel exhibits an outlet in the area of the window or lens of the electromagnetic element.

7. The device according to claim 6, wherein the channel in the outlet area is aligned slanted relative to the window or lens, so that the temperature-moderated fluid can exit into the processing chamber with a flow component parallel to window surface or lens surface.

8. The device according to claim 7, wherein the channel is a channel that envelops the entire electromagnetic element, and extends between a inner casing area that directly envelops the electromagnetic element and an outer casing area that envelops the channel.

9. The device according to claim 8, wherein the channel exhibits a cross section that is circular or bordered by an inner and outer polygon perpendicular to the direction of flow.

10. The device according to claim 1, wherein the device exhibits a fluid sink through which the fluid is removed from the processing chamber.

11. The device according to claim 10, wherein the fluid sink is fluidically connected with the fluid source, thereby bringing about a fluid circulation.

12. The device according to claim 11, wherein the fluid is prepared between the fluid sink and the fluid source.

13. The device according to claim 12, wherein the electromagnetic element is temperature moderated by streaming fluid.

14. The device according to claim 1, wherein the electromagnetic element exhibits a thermal insulating layer applied to the edge of its window and/or its lens, or the edge of its window and/or its lens consists of a thermally insulating material.

15. The device according to claim 1, characterized in that at least one electromagnetic element is an optical sensor, in particular an infrared sensor.

16. The device according to claim 1 characterized in that the electromagnetic element exhibits a casing and a window and/or a lens in the casing, which is directed in the processing chamber.

17. The device according to claim 16 characterized in that the casing of the electromagnetic element exhibits a channel through which the temperature-moderated fluid can flow.

* * * * *